United States Patent
Wong et al.

(10) Patent No.: US 11,372,681 B2
(45) Date of Patent: Jun. 28, 2022

(54) SLAB MEMORY ALLOCATOR WITH DYNAMIC BUFFER RESIZING

(71) Applicant: EMC IP Holding Company LLC, Hopkinton, MA (US)

(72) Inventors: Tony Wong, Milpitas, CA (US); Abhinav Duggal, Jersey City, NJ (US); Hemanth Satyanarayana, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 72 days.

(21) Appl. No.: 17/088,192

(22) Filed: Nov. 3, 2020

(65) Prior Publication Data

US 2021/0049044 A1    Feb. 18, 2021

Related U.S. Application Data

(62) Division of application No. 16/263,281, filed on Jan. 31, 2019, now Pat. No. 10,853,140.

(51) Int. Cl.
| | |
|---|---|
| *G06F 3/00* | (2006.01) |
| *G06F 5/00* | (2006.01) |
| *G06F 9/50* | (2006.01) |
| *G06F 12/02* | (2006.01) |
| *G06F 16/174* | (2019.01) |
| *G06F 9/54* | (2006.01) |
| *G06F 16/176* | (2019.01) |

(52) U.S. Cl.
CPC ............ *G06F 9/5016* (2013.01); *G06F 9/544* (2013.01); *G06F 12/0253* (2013.01); *G06F 16/1748* (2019.01); *G06F 16/1774* (2019.01); *G06F 2209/5011* (2013.01); *G06F 2212/7203* (2013.01); *G06F 2212/7205* (2013.01)

(58) Field of Classification Search
CPC ............... G06F 9/5016; G06F 16/1774; G06F 16/1748; G06F 9/544; G06F 12/0253
USPC .......................................................... 710/56
See application file for complete search history.

(56) References Cited

U.S. PATENT DOCUMENTS

| | | | |
|---|---|---|---|
| 9,021,421 B1* | 4/2015 | Corry .................. | G06F 12/0253 711/163 |
| 2002/0128994 A1* | 9/2002 | Sadhasivan ......... | G06F 12/0246 |
| 2004/0044859 A1* | 3/2004 | Wong .................. | G06F 12/0246 711/217 |
| 2009/0307432 A1* | 12/2009 | Fleming .............. | G06F 12/0284 711/170 |

* cited by examiner

*Primary Examiner* — Chun Kuan Lee
(74) *Attorney, Agent, or Firm* — Staniford Tomita LLP

(57) ABSTRACT

Embodiments for allocating and reclaiming memory using dynamic buffer allocation for a slab memory allocator. The method keeps track of a count of a total number of worker threads and a count of a total number of quiesced threads, and determines if there is any free slab memory. If there is no free slab memory, the method triggers an out of memory event and increments the count of the total number of quiesced threads. It reclaims all objects currently allocated in an object pool, and allocates a buffer of a next smaller size than an original buffer until a sufficient amount of slab memory is freed.

20 Claims, 12 Drawing Sheets

Example 1: very low maximum tag limit = 5

L0 dictionary

| | | |
|---|---|---|
| FP1 | 5 Tags | 3 evicted |
| FP2 | 3 | |
| FP3 | 5 | 2 |
| FP4 | 5 | 4 |
| FP5 | 2 | |

402

9 tags are evicted unnecessarily.

FIG. 4A

Example2: very high limit = 30

L0 dictionary

| | | |
|---|---|---|
| FP1 | 17 Tags | |
| FP2 | 15 | |
| FP3 | 18 | |
| FP4 | 3 | |
| FP5 | 1 | |

412

Memory can be exhausted after the third FP. No more memory for FP4 and Fp5 and anything after that.

FIG. 4B

SLAB MEMORY ALLOCATOR WITH DYNAMIC BUFFER RESIZING

CROSS-REFERENCE TO RELATED APPLICATIONS

The present application is a Divisional Patent Application of U.S. patent application Ser. No. 16/263,281 filed on Jan. 31, 2019, and is related to U.S. patent application Ser. No. 16/252,308, filed on Jan. 18, 2019, and entitled "Mostly Unique File Selection Method for Deduplication Backup Systems" and which is assigned to the assignee of the present application. Each related application is incorporated by reference in its entirety.

TECHNICAL FIELD

Embodiments directed to data migration, and specifically to allocating and reclaiming memory using dynamic buffer allocation for a slab memory allocator.

BACKGROUND OF THE INVENTION

In clustered network environments, a cluster is a collection of multiple nodes that communicate with each other to perform set of operation at high available rates. A cluster can have on the order of four or eight nodes and each node is single entity machine or server. Clusters can be easily scaled-up by adding additional nodes. As a cluster grows, the distribution of the data can become uneven because of the addition or deletion of nodes, or an unbalanced ingest rate from the clients. In this case, files should be moved between nodes to balance the load. It is also possible that data should be redistributed due to performance bottlenecks. In all these cases, a load balancer module of the cluster needs to select a subset of files from the congested node to migrate to another node. In a cluster-based storage system where each cluster contains a number of nodes and heavy data loads, proper operation involves frequent, if not constant movement of files among the nodes to maintain efficiency.

In a deduplication backup system, such as the EMC DDFS (Data Domain File System) scaled out architecture, files are assigned a unique fixed-size (e.g., 64-bit) tag ID to collocate files from the same client or backup application together. The load balancer in DDFS distributes files with the same tag on the same data node. When the data node's used capacities become unbalanced, a file selection process, such as the Mostly Unique File Selection (MUFS) process (described in the above cross-referenced U.S. patent application), is used to compute the unique sizes of each tag and the most unique tags are selected for data migration. A tag is a 64-bit (or similar size) number that is assigned to a group of related files by the application software, and a tag is unique for different groups of files. In the MUFS process, an L0 segment-to-tag dictionary is used to map a key (e.g., SHA fingerprint of a data segment) to a list of tags that have reference to that data segment.

For large-scale data networks with upwards of hundreds of thousands of files, the buffers that hold the tags can become significant in terms of memory size. Providing fixed size buffers is problematic in that setting too low a tag limit per buffer will result in evicted tags, and setting it too high will exhaust memory for later entries. Thus, some form of memory allocation is required to provide proper load balancing for tag buffers in a file selection process. For applications in which there are very few entries in the dictionary and memory is plentiful, any simple memory allocator can be used. However, if there are several hundreds of millions of data segments, such as in the DDFS file system, and there is a limited amount of memory, a traditional memory allocator is not sufficient. In general, a dictionary is an implementation of an associative array data structure. It consists of a collection of key-value pairs, where each key-value pair maps the key to its associated value.

What is needed, therefore, is a memory allocation system that dynamically reclaims a portion of larger memory buffers to make room for smaller allocations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4A shows an example of tag eviction when a low maximum tag limit is set in an example embodiment.

FIG. 4B shows an example of memory exhaustion when a high tag limit is set in an example embodiment.

DETAILED DESCRIPTION

Figure 1:
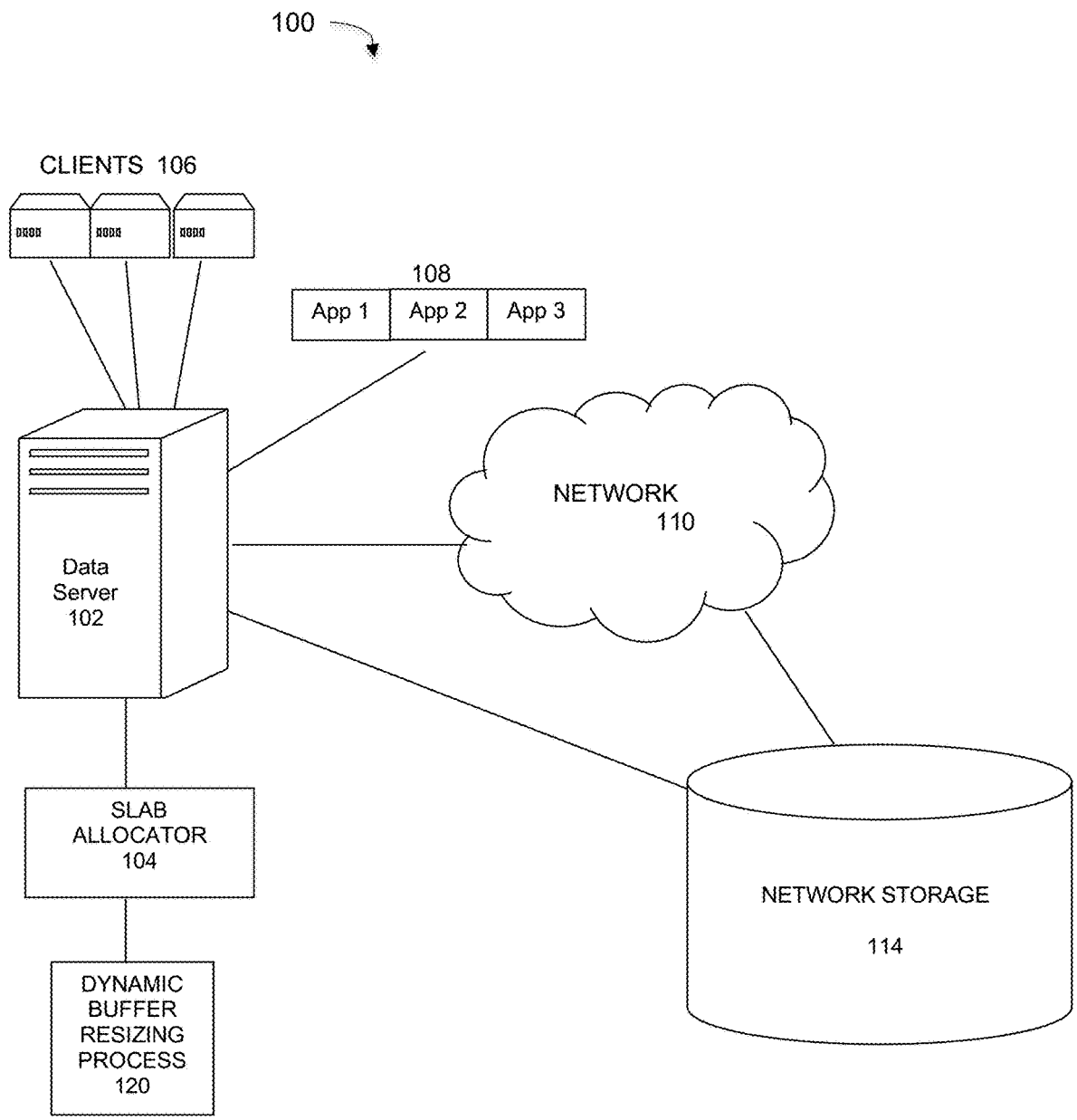
FIG. 1 illustrates a computer network system that implements one or more embodiments of a slab memory allocator with dynamic buffer resizing.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing and backup in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method and system for use in a data system that processes large amounts (hundreds of millions or more) data segments by working with a slab allocator to reclaim memory to adapt to different workloads.

FIG. 1 illustrates a computer network system that implements one or more embodiments of a large-scale network dynamic buffer resizing process for a slab allocator. In system 100, a data server 102 sources data to be stored in storage medium 114. The data could be application data, operating system (OS) data or any other relevant type of data. The data may be sourced or processed by application software executed by the data server or other server in system 100, and may comprise database data, real-time sensor data, or any other appropriate type of data. For system 100, such data typically comprises large data sets as may be used in big data systems, enterprise data environments, and so on.

The data server 102 may be coupled directly to storage 114 or it may be coupled indirectly over a network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform.

The data generated or sourced by system 100 may be stored in any number of persistent storage locations and devices, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays.

In an embodiment, system 100 may represent a large-scale backup system, such as a Data Domain Restorer (DDR)-based deduplication storage system, and storage or backup server 102 may be implemented as a DDR Deduplication Storage server provided by EMC Corporation that provides a platform for data backup, archiving, and disaster recovery. Such a system runs a file system referred to as a Data Domain File System (DDFS). However, other similar backup and storage systems are also possible.

Dynamic Buffer Resizing for Slab Allocation

As shown in FIG. 1, system 100 includes a data server 102 that sources or processes data from various different data sources such as clients 106 and/or applications 108. The data is stored in network storage 114, which may be a unitary storage device (e.g., HDD) or distributed storage, or even virtual machine (VM) storage. To optimize storage space, access times, and other performance aspects, data from the same or similar sources (clients) or applications are typically stored together. However, in heavy data processing scenarios in which data is constantly written from many sources, such logical organization of data based on data type may not be easily achieved.

The slab allocator component 104 is a memory management tool for efficiently allocating memory for data objects (originally kernel objects) by eliminating fragmentation caused by allocations and deallocations of memory space for the data objects. The technique is used to retain allocated memory that contains a data object of a certain type for reuse upon subsequent allocations of objects of the same type. With slab allocation, memory chunks suitable to fit data objects of certain type or size are pre-allocated. The slab allocator keeps track of these chunks so that when a request to allocate memory for a data object of a certain type is received, it can instantly satisfy the request with an already allocated slot. Destruction of the object does not free up the memory, but only opens a slot which is put in the list of free slots by the slab allocator. The next call to allocate memory of the same size will return the now unused memory slot. This process eliminates the need to search for suitable memory space and greatly alleviates memory fragmentation. In this context, a slab is one or more contiguous pages in the memory containing pre-allocated memory chunks.

Figure 2:
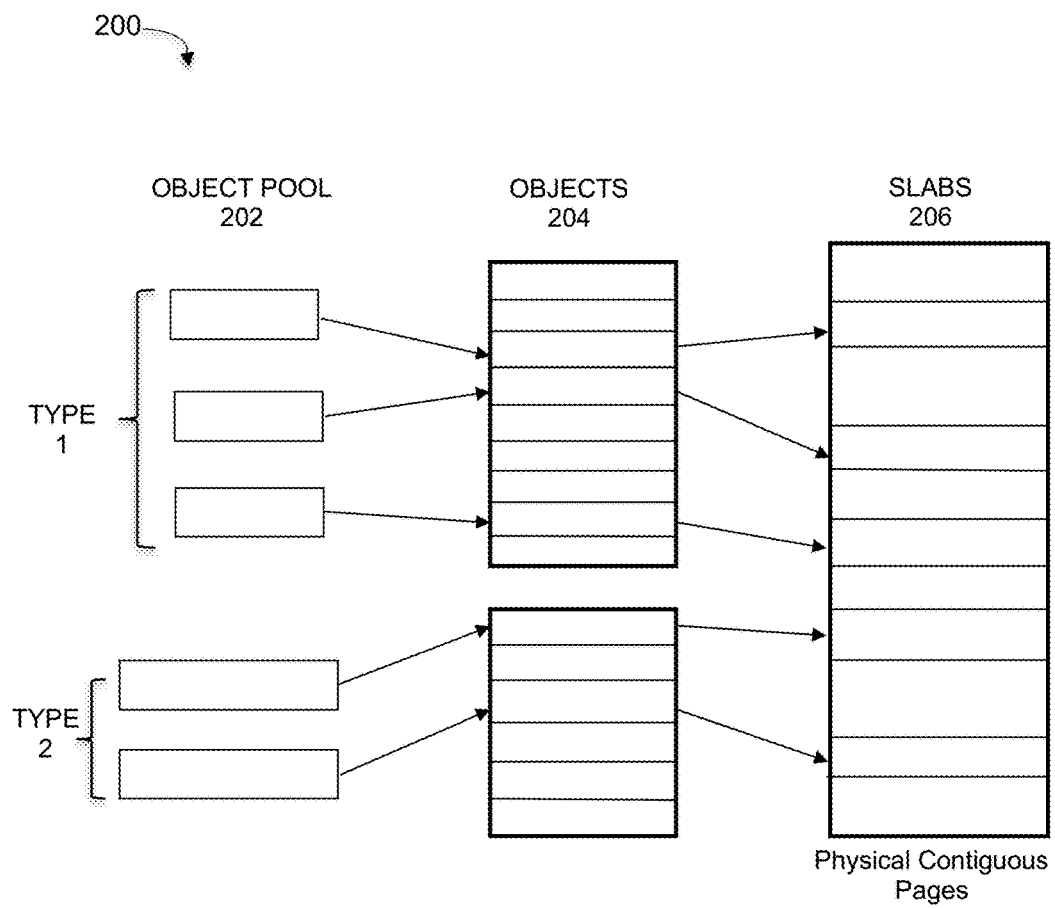
FIG. 2 illustrates an example process of slab allocation as used with a dynamic buffer resizing process, under some embodiments.

FIG. 2 illustrates an example process of slab allocation as used with a dynamic buffer resizing process, under some embodiments. As shown in diagram 200, data objects 204 of several different types (e.g., Type 1 and Type 2) are stored in separate entries object pool 202. The data may be typed based on size, create data, data source, application, client, or any other relevant way of associating or differentiating a data objects with other data objects.

The data pool may be implemented in relatively small amounts of very fast memory, or any other appropriate storage implementation. One or more slabs 206 act as the actual container of data associated with objects of the specific type of the containing pool. When a program sets up an object pool, it allocates a number of objects to the slabs associated with that pool. This number depends on the size of the associated slabs. A slab essentially represents the amount by which an object pool or other object storage can grow or shrink. It represents one memory allocation to the object storage from the machine, whose size is customarily a multiple of the page size. A slab allocator process provides stocks of memory areas whose dimensions and initialization are optimized for these standard data structures.

As shown for the example of FIG. 2, the operating system directs the data objects to objects pools configured for the data objects from different object pools that can be rapidly allocated upon request. The dimensions are typically different for every type of data object. The object pools do not directly contain and manage these memory areas. Instead, the data objects 204 reside in the slabs which are pages of memory, whose number is generally chosen to reduce memory fragmentation. If a particular object pool is full, a new slab is typically allocated somewhere in the primary memory and it is added to the pool.

Referring back to FIG. 1, the slab allocator 104 subdivides a fixed size slab into many small objects of a specific size. These object sizes must be pre-configured. In an example embodiment, the slab allocator 104 is used in conjunction with a file selection process that selects unique files for migration among nodes in a cluster environment. Such a process may be an MUFS process, such as that described in the cross-reference U.S. patent application cited above, though other similar methods are also possible.

Figure 3:
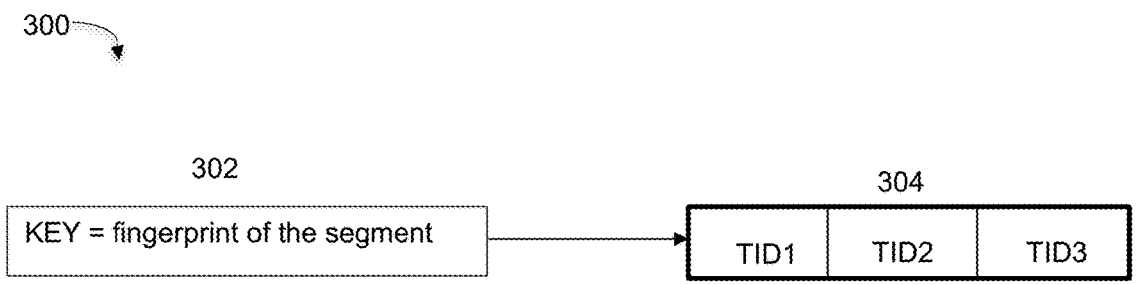
FIG. 3 illustrates the mapping of a fingerprint of a segment to a list of tags, under an embodiment of an example file selection process that uses slab allocator and dynamic buffer resizing process.

In a specific example of a file selection process, MUFS is used for a DDFS VSO (virtual scaled out) architecture in which files are assigned a 64-bit tag ID to collocate files from the same client or backup application together. The load balancer in DDFS distributes files with the same tag on the same data node. When a node's used capacities become unbalanced, the MUFS process is used to compute the unique sizes of each tag and the most unique tags are selected for data migration. The process relies on the construction of a L0 segment-to-tags dictionary. Namely, given the SHA fingerprint of a data segment, the dictionary maps that key to a list of tags that have reference to that data segment. FIG. 3 illustrates the mapping of a fingerprint of a segment to a list of tags, under an embodiment of an example file selection process, such as MUFS. In diagram 300 of FIG. 3, the key 302 is the fingerprint of the data segment, and is mapped to the list 304 of tags that reference this segment. For this example, the tags are denoted by a tag identifier (TID) as Tag1, Tag2, and Tag3. Depending on implementation, the number of the tag references can vary between 1 to a very high number (e.g., 10,000 in a DDFS application).

In the MUFS example, the key is the L0 segment's fingerprint and the values are the tags that are referencing the L0 segment. The MUFS application is somewhat special because it tolerates some tags to be dropped, and thus a dynamic allocation process can be used, wherein in most generic use cases, values cannot be dropped. Other than MUFS, the dynamic allocation process can be applied in certain caching applications, such as caching some objects in many hash buckets where the hash buckets have variable size. When the system runs out of memory, it will shrink the size of the largest buckets. For such cache applications, it is generally acceptable to drop some of the cache objects.

As stated above, for systems in which there are very few entries in the dictionary and memory is plentiful, any simple memory allocator can be used for the file selection process. However, there are several hundreds of millions of data segments in the DDFS file system and there is a limited amount of memory, a more advanced memory allocator is needed. FIGS. 4A and 4B provide an example demonstration of why a dynamic memory allocator is needed. For these figures, it is assumed that the total number of tags the memory can hold is 50. FIG. 4A illustrates an example case where the tag limit is set to a very low limit (e.g., tag limit=5). As can be seen in this example, for FP set 402 in the L0 dictionary, three tags for FP1 are evicted, two tags for FP3 are evicted and four tags for FP4 are evicted, resulting in nine tags being evicted unnecessarily. FIG. 4B illustrates an example case where the tag limit is set to a very high limit (e.g., tag limit=30). In this case, for FP set 412 in the L0 dictionary, memory can be exhausted after the third FP (FP3), and no more memory is available for FP4 and FP5 and anything after that. Thus, setting a tag limit too low results in unnecessary tag eviction, and setting it too high results in unavailable memory.

In an embodiment of system 100, the slab allocator 104 includes a dynamic buffer resizing process 120. Process 120 includes a method to dynamically reclaim portion of the larger memory buffers to make room for the smaller allocation. Initially a large limit is set, and it is dynamically reduced once all the available memory is exhausted. The slab allocator 104 will inform the consumer that the memory buffer must be shrunk to a smaller size (e.g., half the size)

and that the consumer must drop some of its content. The dynamic buffer resizing process 120 allows the slab allocator to adapt to the workload, and prevent any unnecessary dropping of data. After operation, the resizing solution may still require the application to drop some of its content, even after buffer resizing. However, this is usually allowed in certain file selection processes and it will only introduce a small error in any estimates used in those processes, such as the MUFS process.

Embodiments provide the ability to reclaim memory to adapt to the workload. Besides the file selection process for moving files among cluster nodes, another example use case is a cache subsystem where objects are cached in memory and they can be completely evicted to make room for new objects.

A dynamic memory slab allocator is designed to supply the memory allocation of the data objects buffers for data such as tag IDs. As stated above, fixed size buffers are impractical and it is virtually impossible to configure the allocator to handle all kinds of workloads. If it is configured to handle very large reference count and the reference counts are high for many segments, it can run out of memory very quickly. If it is configured to have a low reference count limit, it will lose information while there is still a lot of memory left.

The strategy of the dynamic buffer resizing process 120 is to set a reasonably high maximum count (e.g., 512 tag IDs) that can accommodate segments with high reference counts. If the memory allocator runs out of memory, it will trigger a reclaim callback mechanism to a dictionary subsystem and request it to return half of the buffer back to the allocator. For systems with variable size buffers (large and small), the memory allocator will choose the largest buffer first for space reclamation and it will reduce the maximum reference count by half.

Allocation and Reclaim Architecture

The slab allocator 104 will be used to provide variable size memory buffer allocation. The dynamic buffer resizing process includes a reclaim mechanism that allows the dictionary to dynamically adjust the maximum buffer size when the memory is exhausted.

Figure 5A:
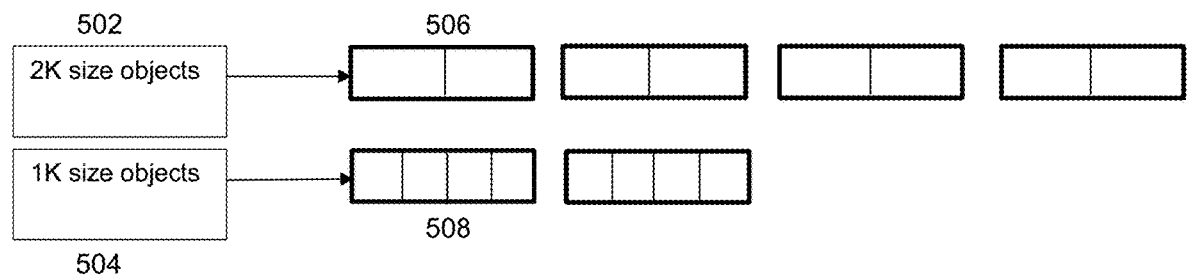
FIG. 5A shows a link list of two different size buffer groups maintained in a slab allocator, under an example embodiment.

In an embodiment, the slab allocator maintains a link list of all allocated buffers grouped by its buffer size. FIG. 5A shows a link list of two different size buffer groups maintained in a slab allocator, under an example embodiment. As shown in FIG. 5A, there are two sizes of objects, 2K (object 1 502) and 1K (object 2 504. These objects are stored in a number of slabs 506 and 508 that are all of a particular size, such as 4K. These sizes and numbers are provided for example only, and any practical size and number of buffers may be used.

In general, a slab cannot be split or broken into smaller portions. The process can only carve out smaller objects from a slab. In an embodiment, the reclaim process requires shrinking the objects in two larger slabs such that all those objects can fit into just 1 slab of small object size. It can then free up a slab for new allocations. Thus, in FIG. 5A, the slabs 506 and 508 are the same size, and the objects inside 508 are half the size of the object in 506, in an example configuration of objects within slabs.

In general, objects are shrunk by reducing their sizes by some amount, such as by one-half as described in the examples herein, though any portion is possible, such as ¼, ¾, ⅓, ⅔, and so on. Thus, the actual portion is typically an arbitrary choice. In certain applications as mentioned above, these objects contain array of tags. When the object is shrunk, it holds fewer tags. Therefore, some of the tags have to be "dropped" randomly. To shrink an object, the reclaim thread makes a callback function to the consumer of the memory object indicating that the object must be shrunk. The caller will then allocate a new object of half the size and copy only the portion of tags (randomly) that can fit the new buffer. Then it will free up the original buffer. After this procedure, it will free up a portion (e.g., half) of the memory. If this process is applied to two slabs of objects, it will free up one of the two slabs, in the case of a half portion. This scenario is illustrated and explained in the FIGS. 5A and 5B.

In this embodiment, the shrinking of an object is effectively done by brute force in that the owner of the object is told to allocate a smaller object and free up the large object. In doing so, the owner must decide to drop some contents in the larger object. Thus, in practical application, this method is meant for applications that can afford to drop tags or other data content, such as in the MUFS case.

Figure 5B:
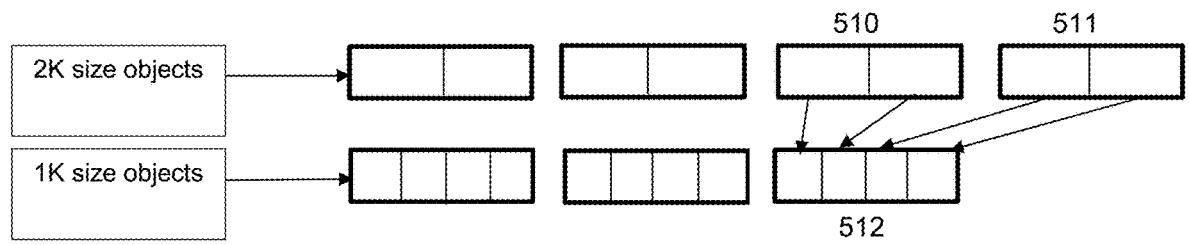
FIG. 5B illustrates shrinking a large buffer to produce a free buffer, under an example embodiment.

FIG. 5B illustrates the dynamic allocation of large buffer space under an example embodiment. In practical operation, the system will fill the large buffers first and then the small buffers. If the memory is exhausted, the slab allocator will choose a buffer with the largest size and call the reclaim function of the dynamic buffer resizing process 120 with the location of the buffer and the size of the buffer can be used. Some context in the header of the buffer must be retained to locate the dictionary record that owns the buffer and randomly discard enough data elements to fit inside the new buffer.

For the example of FIG. 5B, slab 512 represents a reserved slab that is only used for this reclamation process. Two objects in slab 510 are shrunk to two smaller objects in slab 512, and two objects in slab 511 are shrunk to two smaller objects in 512. Slab 510 is returned to the reserved slab pool, and slab 511 becomes a free slab for the new allocation request. Using this dynamic scheme allow the dictionary to allocate large buffers in case there is enough memory and dynamically adjust the maximum size depending on the workload.

The embodiment of FIG. 5B illustrates reclamation of memory by shrinking objects by half (e.g., in a ratio of 2:1), but other ratios may also be used, such as shrinking the objects into quarters, eighths, and so on.

The slab memory allocator 104 generally subdivides a fixed size slab into many small objects of a specific size. These object sizes must be configured up front. For a file selection process, each tag can be configured to occupy 4 bytes and a typical configuration of data object sizes could be 16, 32, 64, 128, . . . , $2^n$ bytes. The sizes do not necessarily need to increase by powers of 2, but it can simplify certain implementations. Some upper bound must be set for the maximum number of tags in a record, for example, 65,536 (64K). The maximum object size would be 65,536*4 bytes=256 K bytes. The slab size will have to be at least 256K, such as 1 MB. These values are provided for example purposes only, and other values may be used depending on application and configuration. For purposes of description, the slab size is denoted as B (i.e., B=slab size), and S1, S2, S3, . . . Sm=object sizes in powers of 2 for the allocation. These are called object pools (e.g., element 202 of FIG. 2). Initially the maximum size of the object that can be allocated is denoted: Sm.

In the context of the MUFS process of file selection, the selection of the buffer with the largest size and the reclaim interface call to the L0 dictionary subsystem with the location of the buffer can be implemented through the following API elements: reclaim(buffer_ptr, new_size) where buffer_ptr is the pointer to the buffer and new_size is the new size of the buffer that the L0 dictionary can use. Other applications and processes can use other similar data structures, calls, and API elements.

Figure 6:
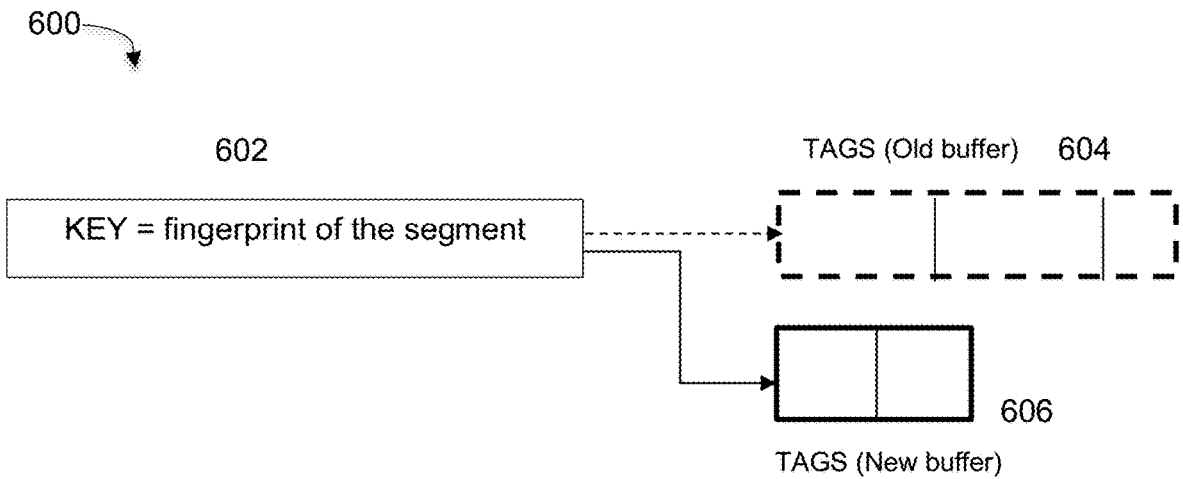
FIG. 6 illustrates a dictionary header update after reclaiming a memory object, under some embodiments.

When the slab allocator reclaims a memory object, it issues a callback to the application with the object pointer and it expects the application to allocate a new object of a smaller size and retain as much information as the new object can hold. According to file selection processes (such as MUFS), the application should randomly select a subset of the tags and discard the rest. However, the application must also update its dictionary header to the new memory object. FIG. 6 illustrates a dictionary header update after reclaiming a memory object, under some embodiments. As shown in diagram 600 of FIG. 6, the key 602 is updated to point to tags in the new buffer 606 rather than the old buffer 604. For the example of FIG. 6, buffer 604 is twice the size of buffer 606.

The reverse mapping from the memory object to the dictionary record header is maintained by the slab memory allocator as a cookie (or similar small data structure) that is passed to the allocator on allocation. Each object pool is associated with another object pool of a size corresponding to the following formula:

size=size of cookie(64 bit)*number of objects in each slab

Therefore, there is a cookie allocated for each object in each object slab. For example, if the slab size B is 1 MB and the object size is 4k (1024 tags), the total number of objects in each slab is 1 MB/4k=256. The associated object pool will provide memory objects of size 8*256=2k for the 4k size object. Each time a slab is allocated for the 4K object pool, an associated cookie object is allocated from the 2K cookie pool to provide the memory to hold 256 cookies for that slab.

Figure 7:
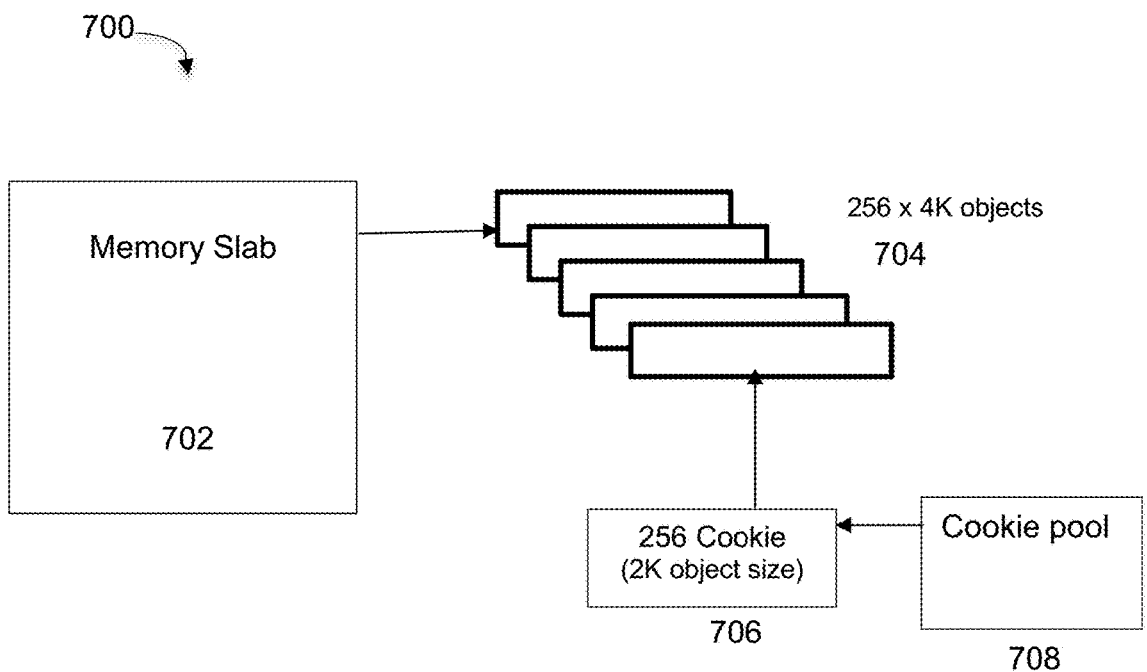
FIG. 7 illustrates an example reverse mapping from a memory object to a dictionary record header, under some embodiments.

FIG. 7 illustrates an example reverse mapping from a memory object to a dictionary record header, under some embodiments. As shown in diagram 700 of FIG. 7, memory slab 702 has 256 4 KB data objects 704. An object of 256 cookies 706 is allocated from the cookie pool 708 for this object pool. The object pool's metadata (shown as 804 in FIG. 8) maps each of the 4k memory objects to its corresponding cookie object. The cookie itself maps the memory object to a user specified pointer/identifier.

In an embodiment, it is assumed that the slab memory allocator maintains a metadata structure for each memory slab and the location of the cookie can be kept in the per slab metadata structure. This is illustrated in FIG. 8 in which metadata structure 804 stores the location of cookie 806 for memory slab 804.

When the application allocates memory, it must pass a cookie to the allocator and that cookie will be returned to the application when then object is reclaimed. In an embodiment, an allocation API (application programming interface) can be configured as follows:

void*allocate(void*object pool,void*cookie)

Figure 8:
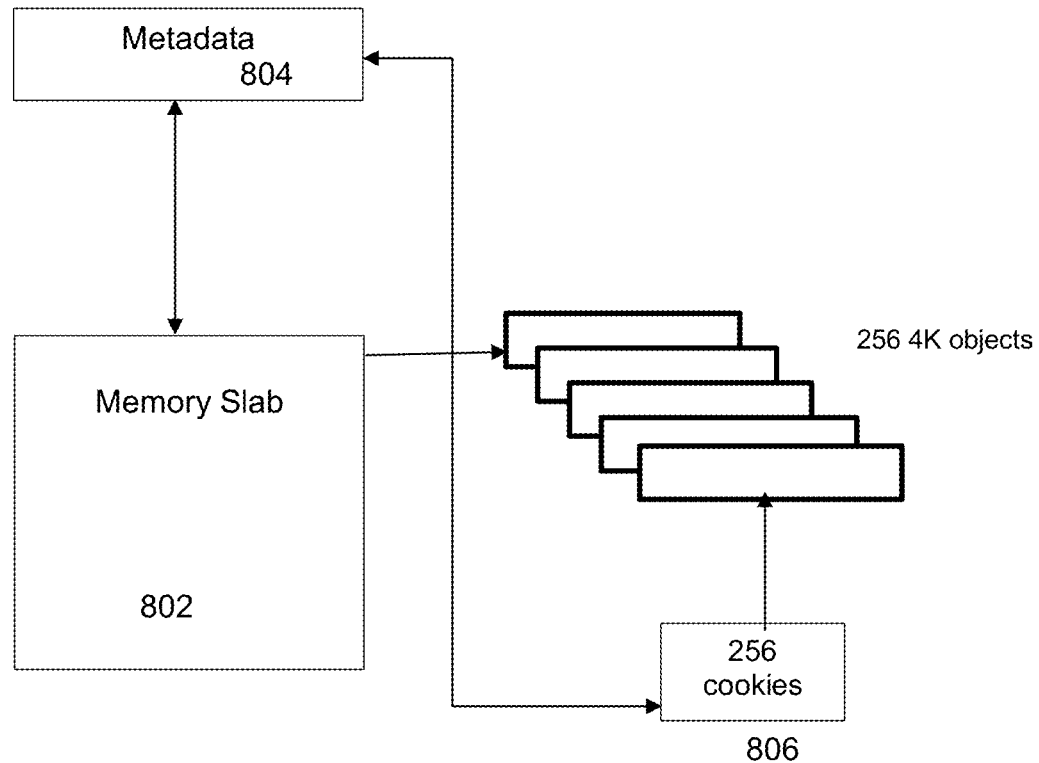
FIG. 8 illustrates a metadata structure for a cookie of FIG. 7 under an embodiment.

Note that this cookie is stored in the cookie object shown in FIGS. 7 and 8.

Allocation and Reclaim Process

Figure 9:
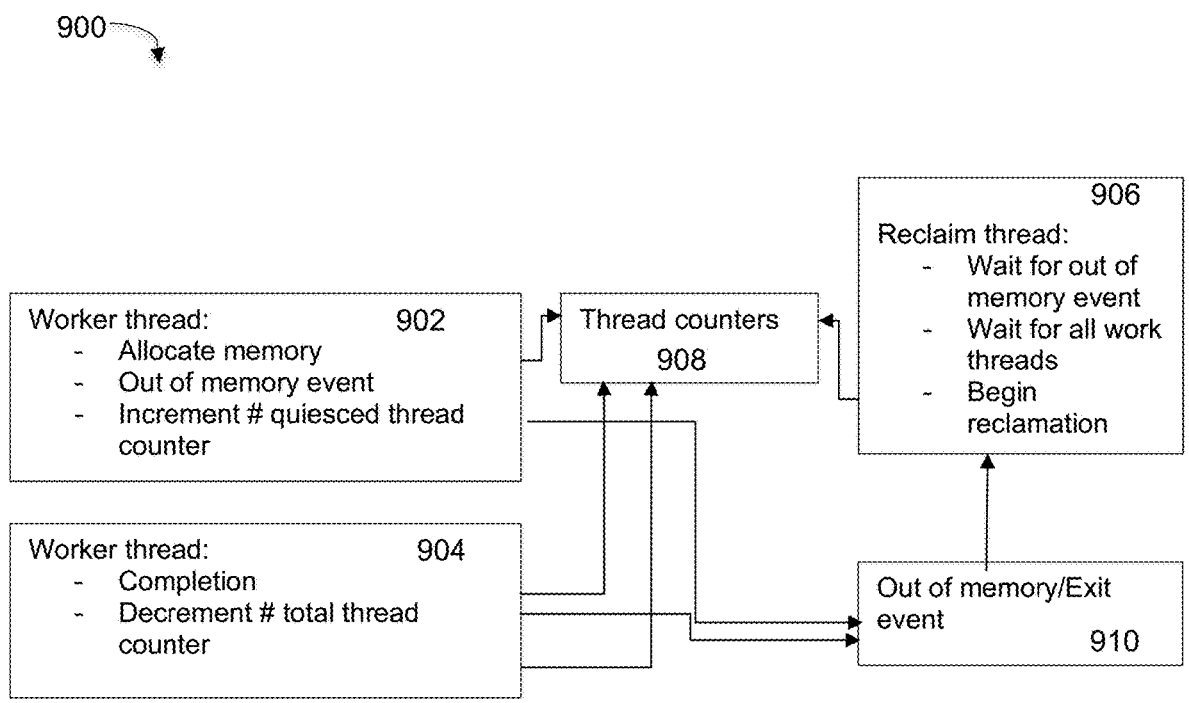
FIG. 9 illustrates an allocation and reclaim procedure for the dynamic buffer resizing process, under some embodiments.

Diagram 900 of FIG. 9 illustrates an allocation and reclaim procedure for the dynamic buffer resizing process, under some embodiments. With regard to an allocation and reclaim procedure 900, in an embodiment, the system keeps track of the total number of worker threads (e.g., 902 and 904) and the total number of threads quiesced, which is zero initially. An asynchronous reclaim thread 906 will be created to process the reclaim procedure. Initially it will be blocked on the out of memory event 910 until all the worker threads have been quiesced, that is: #quiesced=#total.

On every allocation call, if there is no more free slab memory left, the worker thread 902 will trigger the out of memory event 910 and then increment the total number of threads (maintained by thread counter 908) quiesced before it blocks on the reclaim completion event. A worker thread 904 can also exit before the out of memory event 910 occurs. In this case, it must decrement the total number of worker threads and inform the reclaim thread, otherwise the reclaim can wait forever. When the reclaim thread 906 completes the procedure, it will generate a reclaim completion event and wake up all the worker threads.

In an embodiment of FIG. 9, the reclaim thread 906 will reclaim all the objects currently allocated in the object pool Sm. For each allocated object, it will call the application using a reclaim API, such as:

reclaim(void*object pool,void*reclaim_object, void*cookie)

The application can locate the dictionary header from the cookie and there it will have all the sizing information available. It should try to allocate a buffer of the next smaller size, which is half the size of reclaim_object and update its pointer and other information to point to the new object buffer. On return, reclaim_object will be freed. To guarantee the allocation of a smaller object size is successful, the allocator reserves a few slabs that can be used only during the reclaim procedure. Since the size of the smaller object is half of the larger one, after reclaiming two slabs, all the in-use objects must fit into one reserve slab and two slabs will be freed. The net result is that one slab will be freed for every two slabs (one of the two free slabs will be reserved again).

Determining when the reclaim procedure should stop is an implementation specific decision. For simplicity, it can be configured to reclaim all the slabs from the largest pool until enough free slabs have been generated. Then the maximum pool size will be reduced to S(m−1). When the reclamation procedure is completed, the reclaim thread will clear the reclaim event and generate a reclaim completion event to wake up all the worker threads. The application cannot allocate any buffer larger than Sm. If more tags need to be inserted into a buffer of size Sm, some tags must be discarded at random.

Figure 10:
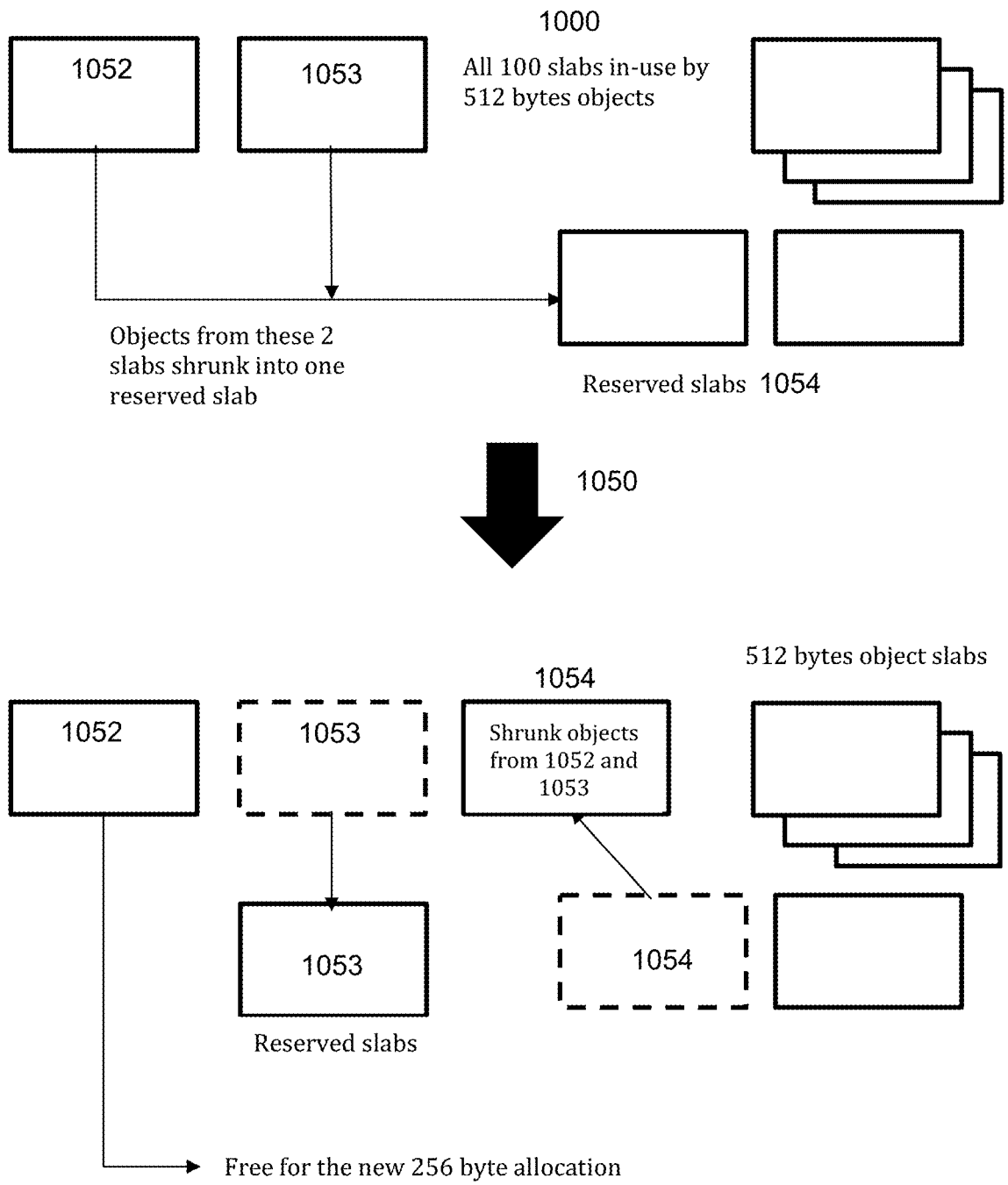
FIG. 10 illustrates how reclamation can free up space for a new allocation in an example allocation and reclaim procedure, under some embodiments.

FIG. 10 illustrates how reclamation can free up space for a new allocation in an example allocation and reclaim procedure, under some embodiments. The example of FIG. 10 shows a total number of 100 example slabs 1000 and two reserved slabs 1054. Objects from two slabs 1052 and 1053 is shrunk into one of the reserved slabs. As shown in FIG. 10, objects in 1052 and 1053 are shrunk into reserved slab 1054, slab 1052 becomes a free slab for the new allocation, and slab 1053 is returned to the reserved slab pool.

If the example object pool sizes are: 256, 512, the reclaim process 1050 is triggered when all the 100 slabs have been allocated for the 512 byte object pool and a new allocation for 256 bytes cannot find any free slabs. After the reclaim procedure, the total number of reserved slabs remains two. One 512 byte object slab becomes the reserved slab and the other one is used for the 256 byte allocation. It is possible that new cookie objects have to be allocated. This is the reason there must be at least two reserved slabs 1054, one for the user objects and one for the cookie objects if needed. Since one user object slab only requires one cookie object (there are many cookie objects in one cookie slab), the cookie objects can be allocated from existing slabs most of the time.

Figure 11:
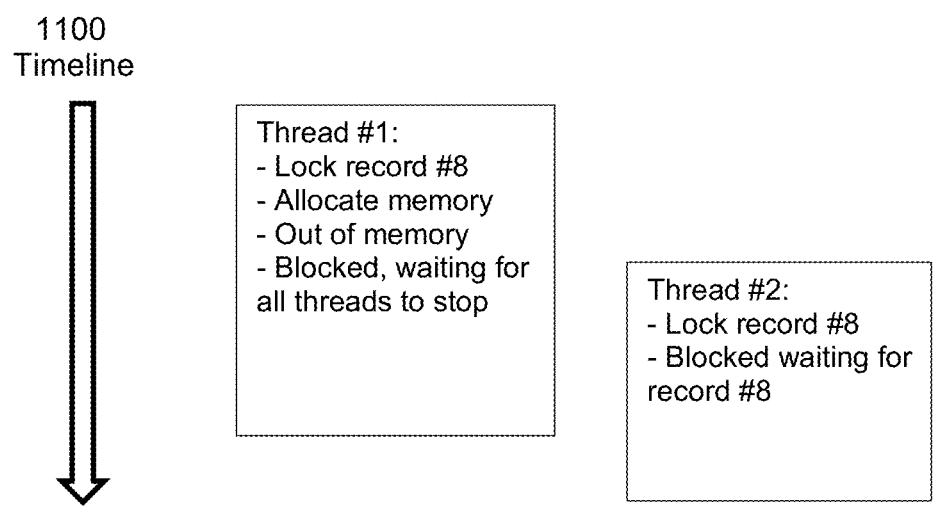
FIG. 11 illustrates an example deadlock situation if a locking protocol is not followed, under some embodiments.

It is expected that at least some of the applications 108 are multi-threaded. This means that they will be competing on the access to the dictionary while new entries are inserted. Thus, some form of synchronization is needed. In an embodiment, locks are used to synchronize the access. However, all locks must be released before the allocation call. If that is not done, some worker threads can deadlock and the reclaim thread will wait forever for them to be quiesced. FIG. 11 illustrates an example deadlock situation if a locking protocol is not followed, under some embodiments.

Against timeline 1100, thread #1 locks record #8, and allocates memory and gets an out of memory situation. If thread #2 tries to lock record #8 after thread #1, thread #2 will be blocked forever, in this case. Therefore, the threads must release their own record locks before calling the memory allocator. After the allocation call, all the conditions of the dictionary record must be re-checked (after acquiring the lock again) to see if the condition has changed. If so, it must discard the newly allocated buffer and retry the insertion of the tag again.

The following conditions are all possible and if not handled properly, they can cause corruption
 (1) The object buffer size has increased and there is no need for a new buffer.
 (2) The object buffer size has increased but it is already full. A larger new buffer is required.
 (3) The object buffer has shrunk (reclaimed) and the new buffer is also NULL.
 (4) The maximum number of tags has been reached and some tags must be discarded.

Figure 12:
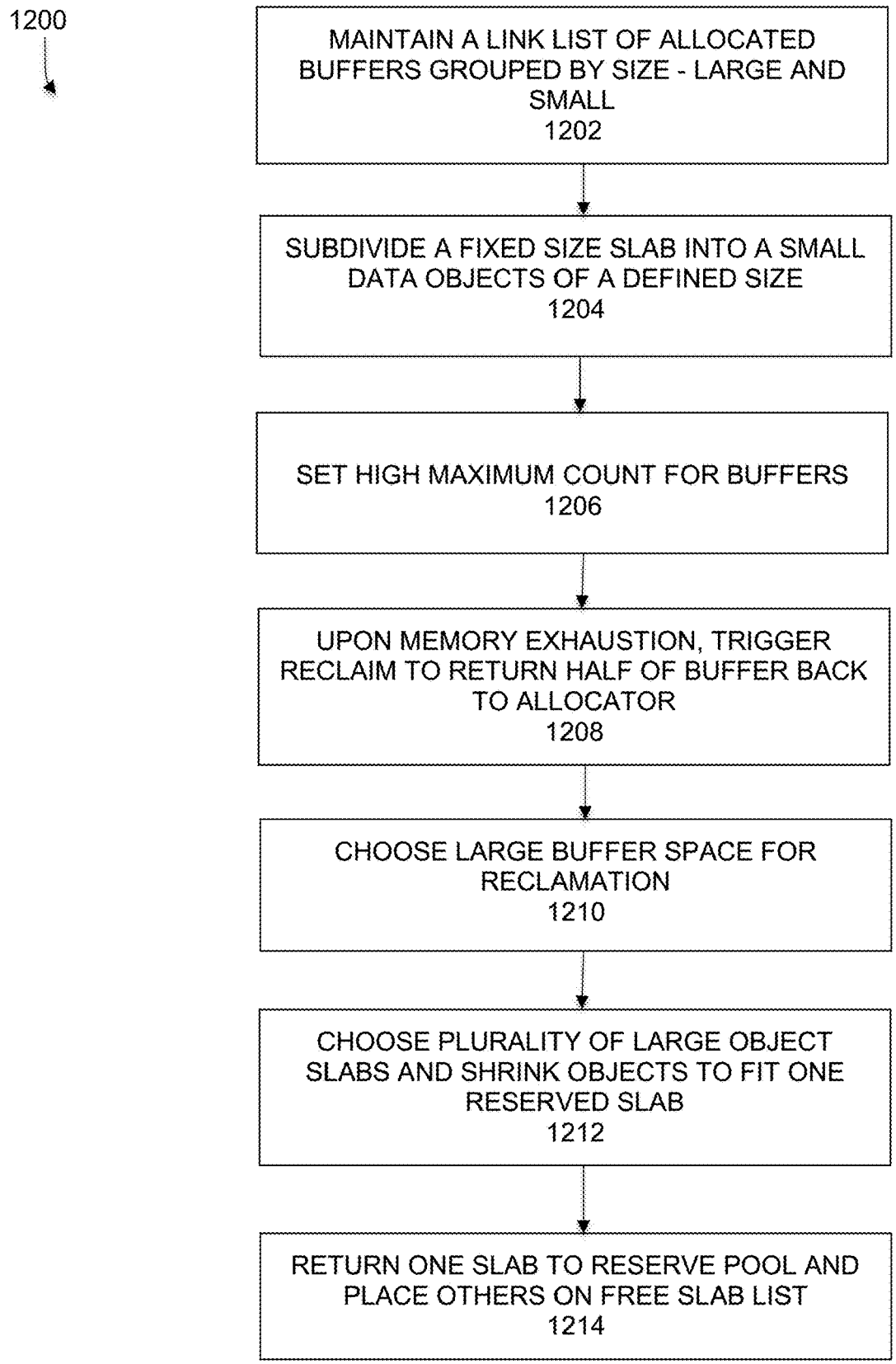
FIG. 12 is a flowchart that illustrates a method of dynamic buffer allocation for a slab memory allocator, under some embodiments.

FIG. 12 is a flowchart that illustrates a general method of dynamic buffer resizing for a slab allocator, under some embodiments. Process 1200 begins with the slab allocator maintaining a link list of all allocated buffers grouped by its buffer size, 1202, such as shown in FIG. 5A. The slab allocator subdivides a fixed size slab into many small objects of a specific size, 1204. The slab allocator will set a reasonably high maximum count that can accommodate segments with high reference counts, 1206. When the memory allocator runs out of memory, it will trigger a reclaim callback mechanism and request it to return half of the buffer back to the allocator, 1208. From the grouped large and small buffers, the memory allocator will choose the largest buffer first for space reclamation, 1210. As shown in step 1212, to reclaim a slab, two or more slabs of large objects are chosen and objects are shrunk to fit in one reserved slab. One of the slabs is returned to the reserved pool and the others are placed on free slab list for new allocation requests, 1214.

Figure 13:
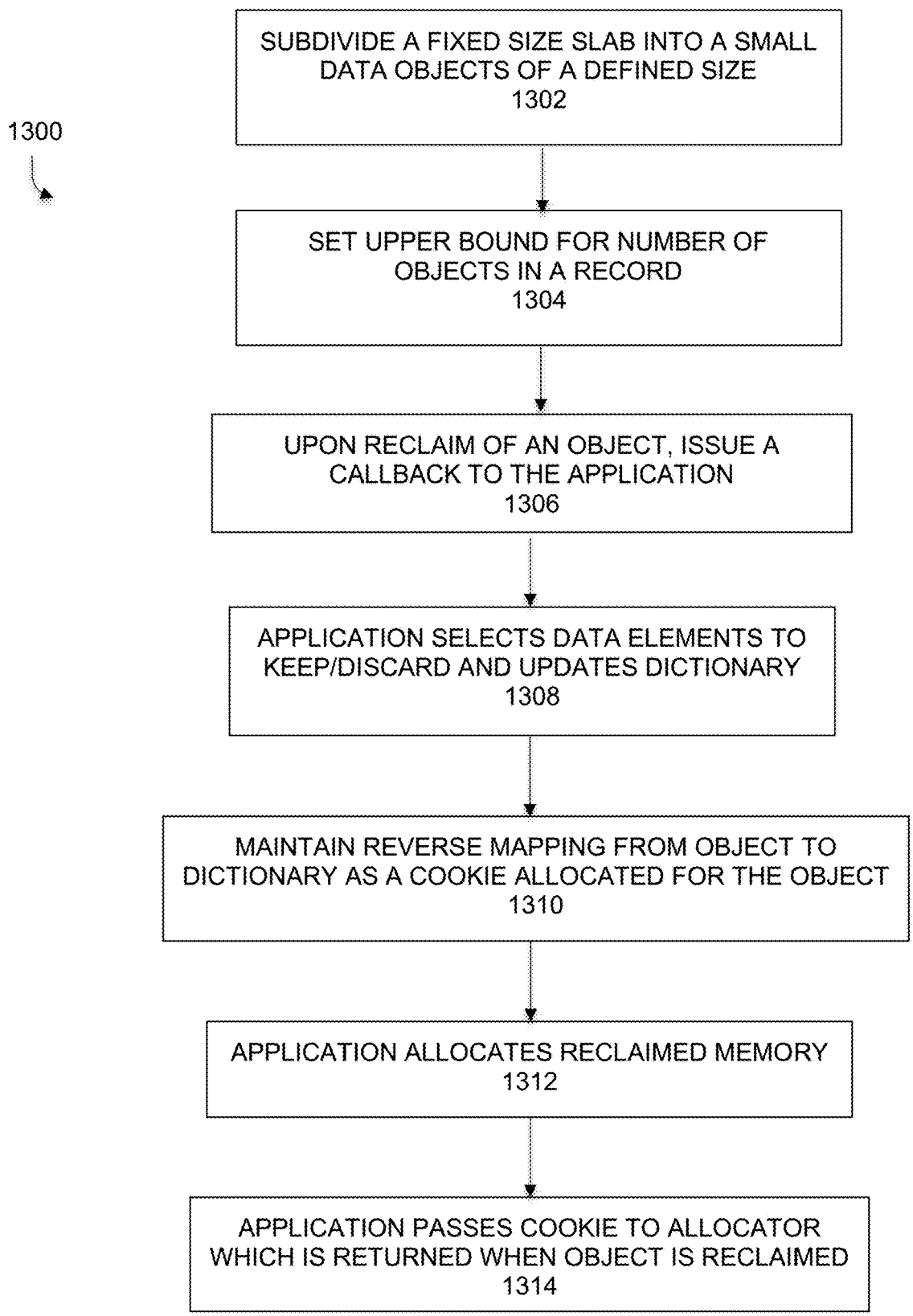
FIG. 13 is a flowchart that illustrates a method of reclaiming memory using dynamic buffer allocation for a slab memory allocator, under some embodiments.

FIG. 13 is a flowchart that illustrates a method of reclaiming memory using dynamic buffer allocation for a slab memory allocator, under some embodiments. Process 1300 starts by subdividing a fixed size slab into small data objects of a defined size, 1302. An upper bound (reasonable maximum size) is then set for the maximum number of objects in a record, 1304. When the slab allocator reclaims a memory object, it issues a callback to the application with the object pointer and it expects the application to allocate a new object of a smaller size and retain as much information as the new object can hold, 1306. The application may need select (e.g., randomly) a subset of the data elements and discard the rest; the application must also update its dictionary header to the new memory object, 1308. The slab allocator maintains a reverse mapping from the data object to the dictionary header, 1310. The reverse mapping is maintained as a cookie associated with the object upon allocation, and kept as metadata as shown in FIGS. 7 and 8. The application then allocates the reclaimed memory 1312. The application passes the cookie to the slab allocator and the cookie is returned when the object is reclaimed, 1314.

Although embodiments have been described with respect to data backup applications and file selection processes for moving files among nodes in a clustered environment, it should be noted that embodiments are not so limited. Embodiments described herein can be applied to any application requiring buffer, cache or other temporary memory allocation when memory is limited and/or an excessive number of data elements must be stored in shared memory resources.

System Implementation

Embodiments of the processes and techniques described above can be implemented on any appropriate backup system operating environment or file system, or network server system. Such embodiments may include other or alternative data structures or definitions as needed or appropriate.

Figure 14:
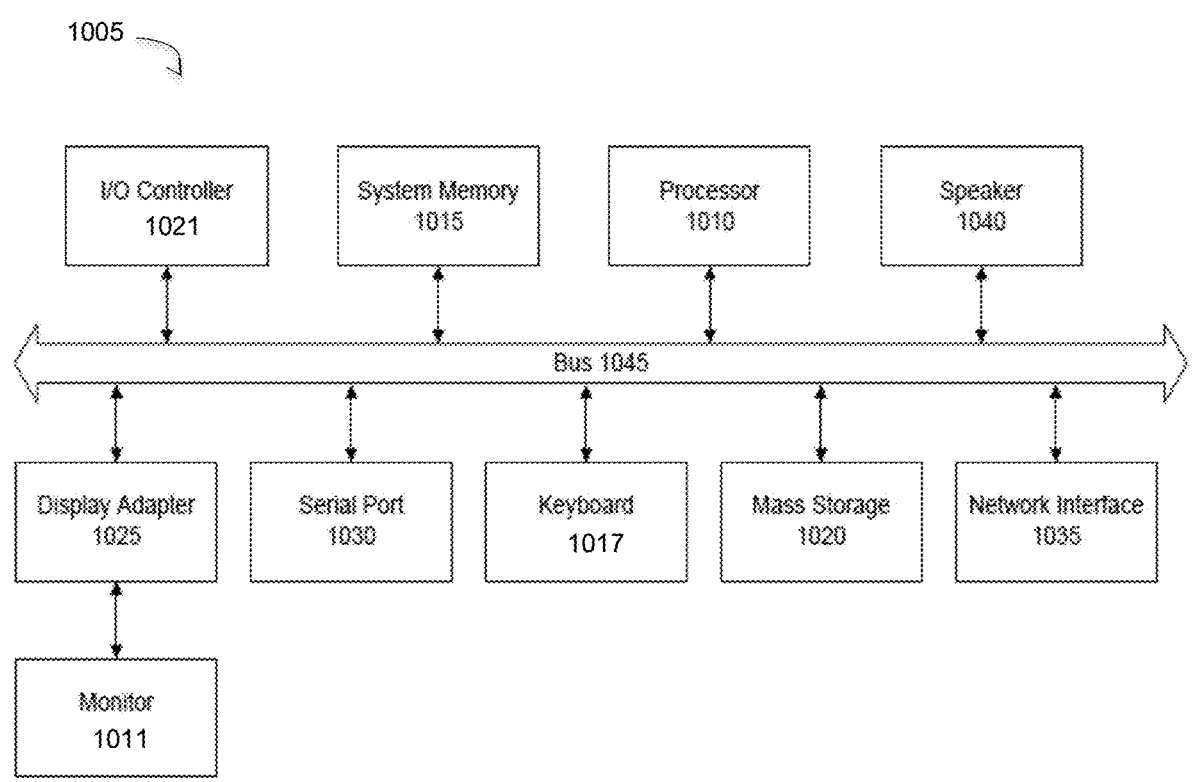
FIG. 14 is a system block diagram of a computer system used to execute one or more software components of the slab allocator process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 14 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 14 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of allocating and reclaiming memory using dynamic buffer allocation for a slab memory allocator, comprising:

keeping track of a count of a total number of worker threads and a count of a total number of quiesced threads;

determining, on every memory allocation call, if there is any free slab memory;

triggering, if there is no free slab memory, an out of memory event and incrementing the count of the total number of quiesced threads;

reclaiming all objects currently allocated in an object pool; and allocating a buffer of a next smaller size than an original buffer until a sufficient amount of slab memory is freed.

2. The method of claim 1 wherein the next smaller size buffer is one-half of the original buffer size.

3. The method of claim 2 wherein the sufficient amount of freed slab memory is determined by an application processing the objects.

4. The method of claim 3 wherein the application is multi-threaded.

5. The method of claim 4 further comprising synchronizing access to the objects by threads of the multi-threaded application through locks.

6. The method of claim 1 further comprising:

shrinking data objects of a fixed size within the slab memory into smaller data objects;

setting an upper bound for a maximum number of objects in a record;

performing the reclaiming step by issuing a callback to an application with a pointer to an object;

allocating, by the application, a new object of a smaller size and retaining as much data as the new object can hold;

selecting, by the application a subset of the data elements to be kept and discarding the remainder, and updating a dictionary header to the new memory object; and allocating the reclaimed memory to the application.

7. The method of claim 6 further comprising maintaining, in the slab memory allocator, a reverse mapping from the data object to the dictionary header, wherein the reverse mapping is maintained as a cookie associated with the object upon allocation, and kept as metadata;

passing the cookie to the slab memory allocator; and returning the cookie to the application when the object is reclaimed.

8. The method of claim 7 wherein the slab memory allocator maintains a metadata structure for each memory slab, and the cookie is maintained as metadata for a memory slab.

9. The method of claim 8 further comprising:

maintaining a link list of allocated buffers grouped by buffer size and organized into small and large buffers;

triggering, by the reclaiming step, a callback to request a portion of the buffers back to the slab memory allocator;

selecting a largest buffer from the grouped buffers for space reclamation; and shrinking data objects in a largest buffer to fit a reserved slab.

10. A system allocating and reclaiming memory using dynamic buffer allocation for a slab memory allocator, comprising a processor executing program instructions that perform a method of:

keeping track of a count of a total number of worker threads and a count of a total number of quiesced threads;

determining, on every memory allocation call, if there is any free slab memory;

triggering, if there is no free slab memory, an out of memory event and incrementing the count of the total number of quiesced threads;

reclaiming all objects currently allocated in an object pool; and allocating a buffer of a next smaller size than an original buffer until a sufficient amount of slab memory is freed.

11. The system of claim 10 wherein the next smaller size buffer is one-half of the original buffer size, and wherein the sufficient amount of freed slab memory is determined by an application processing the objects, and wherein the application is multi-threaded.

12. The method of claim 11 further comprising synchronizing access to the objects by threads of the multi-threaded application through locks.

13. The system of claim 10 wherein the method further comprises:

shrinking data objects of a fixed size within the slab memory into smaller data objects;

setting an upper bound for a maximum number of objects in a record performing the reclaiming step by issuing a callback to an application with a pointer to an object;

allocating, by the application, a new object of a smaller size and retaining as much data as the new object can hold;

selecting, by the application a subset of the data elements to be kept and discarding the remainder, and updating a dictionary header to the new memory object; and allocating the reclaimed memory to the application.

14. The system of claim 13 further comprising maintaining, in the slab memory allocator, a reverse mapping from the data object to the dictionary header, wherein the reverse mapping is maintained as a cookie associated with the object upon allocation, and kept as metadata;

passing the cookie to the slab memory allocator; and returning the cookie to the application when the object is reclaimed.

15. The system of claim 14 wherein the slab memory allocator maintains a metadata structure for each memory slab, and the cookie is maintained as metadata for a memory slab.

16. The system of claim 15 further comprising:

maintaining a link list of allocated buffers grouped by buffer size and organized into small and large buffers;

triggering, by the reclaiming step, a callback to request a portion of the buffers back to the slab memory allocator;

selecting a largest buffer from the grouped buffers for space reclamation; and shrinking data objects in a largest buffer to fit a reserved slab.

17. A computer program product, comprising a non-transitory computer-readable medium having a computer-readable program code embodied therein, the computer-readable program code adapted to be executed by one or more processors to implement a method of allocating and reclaiming memory using dynamic buffer allocation for a slab memory allocator, by:

keeping track of a count of a total number of worker threads and a count of a total number of quiesced threads;

determining, on every memory allocation call, if there is any free slab memory;

triggering, if there is no free slab memory, an out of memory event and incrementing the count of the total number of quiesced threads;

reclaiming all objects currently allocated in an object pool; and allocating a buffer of a next smaller size than an original buffer until a sufficient amount of slab memory is freed.

18. The computer program product of claim 17 wherein the next smaller size buffer is one-half of the original buffer size, and wherein the application is multi-threaded.

19. The computer program product of claim 18 wherein the sufficient amount of freed slab memory is determined by an application processing the objects.

20. The computer program product of claim 19 wherein the method further comprises synchronizing access to the objects by threads of the multi-threaded application through locks.

* * * * *